Oct. 27, 1970  C. V. PLANTA ET AL  3,537,003
FREQUENCY-MEASURING APPARATUS FOR THE INDICATION OF MOMENTARY
VALUES OF THE FREQUENCY OF A SERIES OF IMPULSES, ESPECIALLY
FOR MEDICAL PURPOSES

Filed April 22, 1968  2 Sheets-Sheet 1

United States Patent Office 3,537,003
Patented Oct. 27, 1970

3,537,003
FREQUENCY-MEASURING APPARATUS FOR THE INDICATION OF MOMENTARY VALUES OF THE FREQUENCY OF A SERIES OF IMPULSES, ESPECIALLY FOR MEDICAL PURPOSES
Conradin V. Planta, Basel, and Guido Stebler, Muttenz, Switzerland, assignors to Hoffmann-La Roche Inc., Nutley, N.J., a corporation of New Jersey
Filed Apr. 22, 1968, Ser. No. 722,949
Claims priority, application Switzerland, May 12, 1967, 6790/67; 6792/67
Int. Cl. G01r 23/10
U.S. Cl. 324—79
9 Claims

ABSTRACT OF THE DISCLOSURE

An apparatus for recording momentary frequency values of a relatively low frequency impulse series received by a pick-up provided at the input of the apparatus by measuring the time interval between two consecutive impulses and forming the reciprocal value thereof comprising amplifying means for regulating the impulses to provide a constant output level, means for generating and measuring impulses of a known frequency during the interval, means for generatnig and computing impulses of a higher frequency following the interval, means to limit the number of computing impulses to a predetermined number, means for comparing the computing means with the measuring means to emit a coincidence impulse upon reaching parity and resetting the computing means, a decade counter responsive to the coincidence impulses to correspond to the momentary frequency of the interval displayed by a numerical indicator and initiating a frequency measurement between two further consecutive impulses of the series.

BACKGROUND OF THE INVENTION

Figure 1:
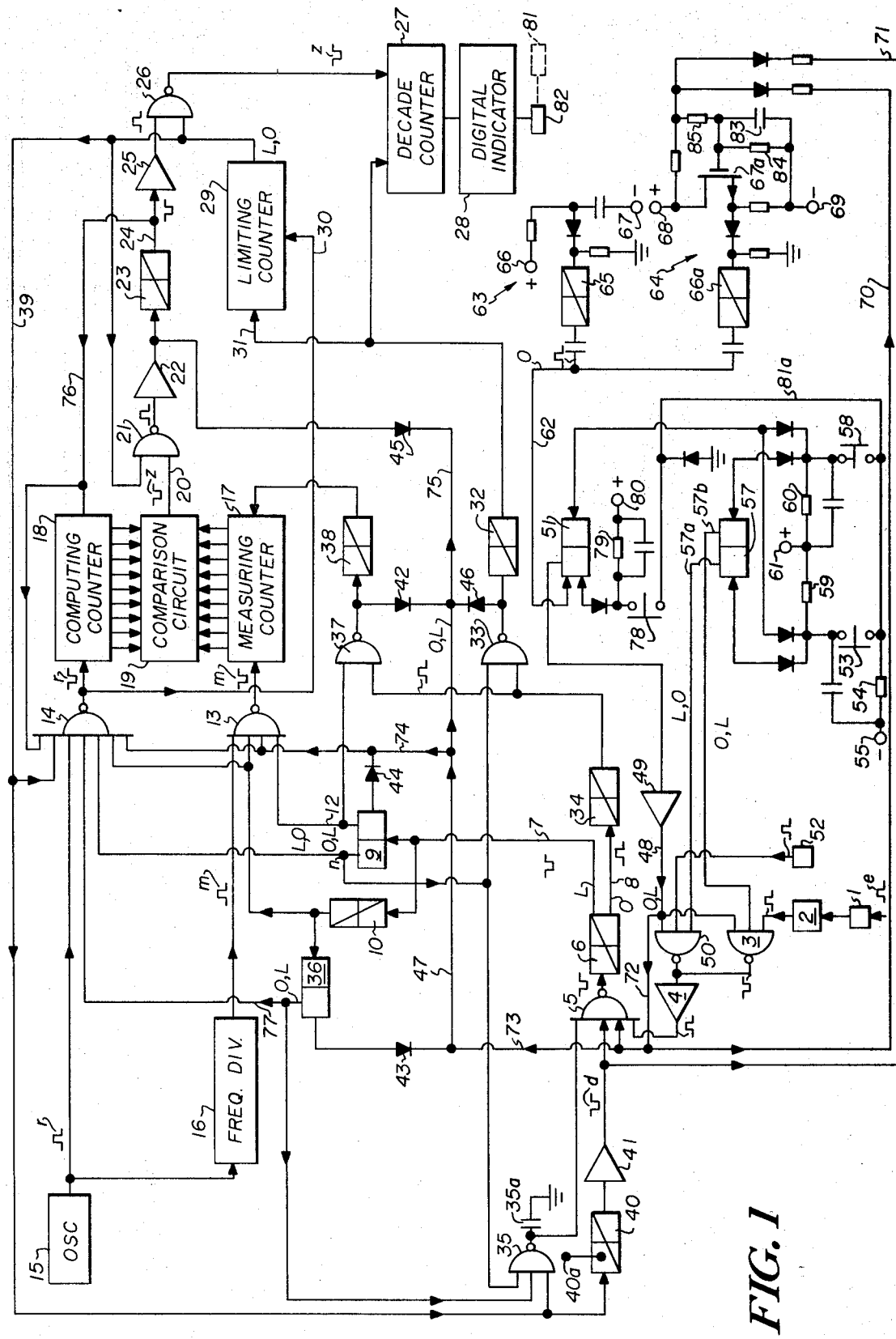

This invention relates broadly to frequency measuring apparatus and more particularly to apparatus for measuring and displaying momentary frequency values of heart beat or other biological processes, such as respiration.

In the prior art devices of this type are available for recording heart beat rate which devices use the reciprocal value of the interval between two impulses formed by means of an analog circuit the result of which is indicated by a pointer instrument. A distinct deficiency of such devices lies in the fact that the result would have to be read from a scale provided on the instrument as opposed to being able to observe heart rate values which are immediately available in numeric form, thus providing an added burden for the physician who is monitoring the cardiac function of a patient by such a device (e.g., during a heart operation). Other types of frequency recorders do have provisions for displaying resultant values in figures; however, these type recorders average the frequency over relatively long time intervals, in the case of heart beat frequency measurers (also referred to as cardiotachometers), for example, average frequency readings are over time intervals of ten to thirty seconds. Clearly, these instruments do not measure the individual heart beat intervals, although it is very valuable to the physician to know whether large or small differences exist between these intervals, or whether great or small variations in the momentary values of the heart beat frequency exist.

SUMMARY

Accordingly, it is the purpose of this invention to produce a frequency recorder of the type heretofore mentioned which does not have the disadvantages advanced above; this instrument can also be used for other purposes although it is designated mainly for medical applications.

The frequency recorder technique according to this invention is characterized by generating impulses of an accurately known frequency for measuring purposes, which impulses are measured during a time interval corresponding to the interval of two consecutive input impulses of an impulse series as, for example, a heart rate; by additionally providing impulses of a frequency considerably higher than that of the measuring frequency, for computing purposes and computing said latter mentioned impulses following the measuring time interval; by limiting the number of computing impulses being computed to a predetermined number; by comparing the measured and computed impulses and energizing a decade or similar counter each time that a value of the computed impulses reaches parity with the measured impulses and simultaneously effect the resetting of the computing operation back to zero whereby the position of the decade counter corresponds to the reciprocal value of the measuring time interval and thus to the momentary value of the frequency of this measuring time interval, and is indicated by a numerical indicator, after which, following a time interval corresponding to the computing process and the duration of indication, the measurement between two further consecutive impulses of the series is repeated. Additionally, in the present invention is an amplifying circuit for maintaining an output level constant within a very wide input level stage by utilizing a negative feedback DC coupled amplifier. Such amplifier circuitry is useful for amplification of impulse signals such as those that are derived from the heart beat of a patient by means of a pick-up transducer attached to the patient's wrist.

Figure 2:
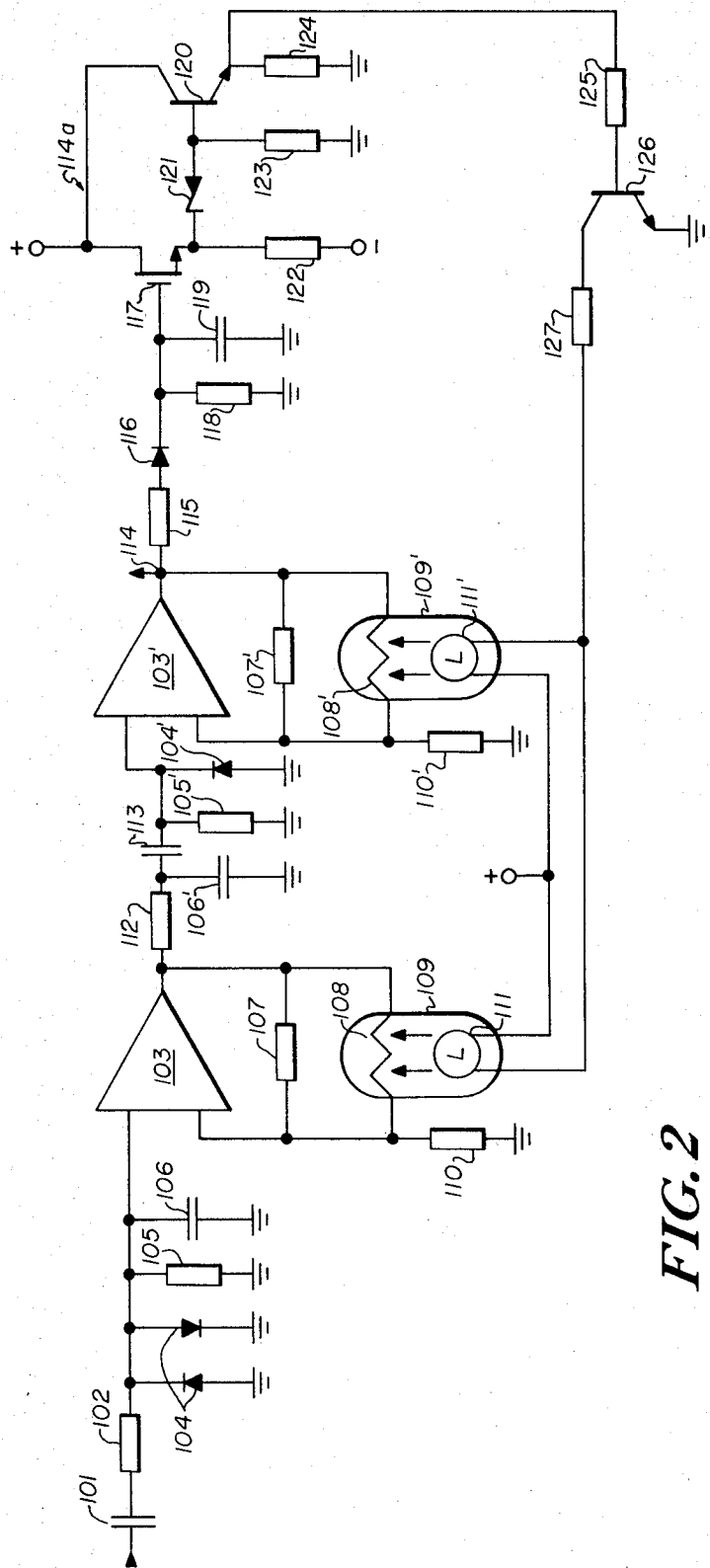

In the drawings:
FIG. 1 shows the circuit diagram of one form of execution of the device according to the invention.
FIG. 2 illustrates a schematic diagram of an embodiment of the amplifier 2 referred to in FIG. 1.

In FIG. 1, there is shown the apparatus having a pick-up 1 of a known type, which may for instance be attached to the patient's wrist, and transmits impulses corresponding to the heart beat to an automatic gain control amplifier 2. The AGC amplifier 2 transforms the received input impulses $e$ into impulses of practically constant level. An amplifier circuit which singularly is believed to have inventive merit is quite suitable for this purpose and is described below in detail.

AMPLIFYING CIRCUIT

In referring to FIG. 2, there is shown in detail amplifier circuit 2, which may form a part of the present invention, wherein the input signal is transmitted through a condenser 101 and a resistor 102 to a transistorized D.C.-amplifier 103, the input of which is protected against over-voltages by antiparallel connected diodes 104. An RC-unit 105, 106, is necessary to delimit the frequency range. Amplifier 103 is provided with a feedback resistor 107, with which photoelectric resistance 108 of a raysistor 109 is connected in parallel. A resistor 110 is connected in series with the parallel circuit 107, 108, so that a voltage divider is formed which determines the effective feedback coupling, the value of which depends on the current which excites the light source 111 of the raysistor 109. The output of amplifier 103 is connected through a resistor 112 and condenser 113 with the input of a second amplifier 103', which amplifier 103' has a similar feedback coupling 107'–111', whereas elements 104'–106' are intended for the purpose of avoiding over-voltage and of frequency limitation. The output of amplifier 103' is also the output 114 of the entire regulating amplifier and is connected with a discriminator 114a, which feeds electrical energy to light sources 111 and 111' when the output voltage exceeds the discrimination voltage of the discriminator circuit 114a.

The output signal of amplifier 103' is conducted through a resistor 115 and diode 116 to the gate of a field effect transistor 117 whereat are also connected a resistor 118 and condenser 119 to impede the action of changes in the output voltage. The drain of transistor 117 and the collector of a second transistor 120 are connected with the positive terminal of a voltage source. A Zener-diode 121 is connected between the source of transistor 117 and the base of transistor 120. The source of transistor 117 is also connected, through a resistor 122, with the negative terminal of the voltage source, which has a center tap connected to ground. A resistor 123 is connected to the base of transistor 120 and to its emitter is connected a resistor 124 as well as the base of a third transistor 126 via a resistor 125. The collector of transistor 126 is connected, through a resistor 127, to the light sources 111 and 111' which are arranged in parallel, and are, in turn, connected in common to the positive terminal of the voltage source. The emitter of transistor 126 and the elements 104–106, 104'–106', 110, 110', 118, 119, 123 and 124 are grounded.

In functioning when a signal which is positive relative to ground occurs at amplifier output 114, then the current in the field effect transistor 117 increases as will also increase the voltage drop across resistor 122. So long as this voltage drop is such that the potential difference at the diode 121 remains below the Zener-diode voltage of, e.g., 3.9 v., then transistors 120 and 126 will not conduct. Accordingly, no current will flow through light sources 111 and 111', in which case the resistance of the photoelectric resistors will therefore be high, and the feedback of amplifiers 103 and 103' will be low. The amplification of the entire circuit is then at its maximum. Should, however, the signal at output 114 be greater than the discriminating voltage of circuit 114a, consisting of the Zener-diode voltage, the gate-source voltage drop of transistor 117 and the base-emitter voltage drop of transistors 120 and 126 (in the order of about 6 volts), then diode 121 (in the Zener area) and transistors 120 and 126 draw collector-emitter currents which increase with the increase of the output voltage above the threshold value. As a result of the increased output voltage, the resistance of the photoelectric resistors is reduced by the correspondingly excited light sources 111 and 111' whereby feedback is increased and the ampyifying factor is diminished. If, however, when impulses are amplified, there occurs a smaller impulse following a larger one whose peak value is stored in condenser 119, the diode 116 will then form a blocking action and the condenser 119 will be discharged with a time constant of, e.g., 1.5 s. until the peak voltage of output 114 increases through the cycle and becomes larger than the voltage at the gate of transistor 117. The diode 116 will then again become conductive and the gate of transistor 117 will take on the new peak voltage.

The described circuit produces a very constant output level. If the input impulses fluctuate between, e.g., 0.4 mv. and 6 v., then the output impulses will only vary by ±5% around a mean amplitude value of 6 v.±.

More detailed data on the circuit elements usable in the amplifier circuitry shown in FIG. 2 are given below.

Amplifier 103: Nexus Type SQ2A
Amplifier 103': Nexus Type SQ10
Raysistors 109, 109': Raytheon Type CK1121
Diodes 104, 104': Philips Type DA202
Diode 116: Fairchild Type FD300
Zener diode 121: Texas Instr. Type 1N748
Field effect Transistor 117: Texas Instr. Type 2N3821
Transistors 120, 126: Intermetall Type 2N1711

Resistances: 102, 105, 107, and 123—100K Ω; 110—680Ω; 112—4.7K Ω; 105'—33K Ω; 107'—470K Ω; 110'—2.7K Ω; 115—1M Ω; 118—10M Ω; 122—47K Ω; 124—15K Ω; 125—2.2K Ω; 127—250Ω.

Capacities: 101—47 μf.; 106—0.22 μf.; 106'—4.7 μf.; 113—1 μf.; 119—4.7 μf.

The terminals of the voltage source have a voltage of +12 v. and −12 v. relative to ground.

FREQUENCY RECORDER

In the ensuing description, for reference sake, it will be understood that the potential of the ground and a negative potential of, e.g., −12 volts are respectively designated as "O"-potential and "L"-potential. An impulse is designated as O-impulse or L-impulse if the potential starting from the L- or O-potential, reaches temporarily the O- or L-potential. The O-impulse is represented by "ʊ" and the L-impulse by "Ω" in the drawing.

In referring back to FIG. 1, the output of the amplifier 2 is connected with an input of a "nand"-gate 3. As is well known, an "and"-gate at the output of which occurs an inversion of the impulse allowed to pass through the gate is denoted as a nand-gate. Although the gates in the present circuit are nand-gates, it is understood that a similar circuit could also be designed with and-gates, and that other, logical gates could also be used, if desired.

The output of the nand-gate 3 is connected through an inversion amplifier 4 with an input of a nand-gate 5, the output of which is connected to a monostable multivibrator 6, which can react to the leading edge of an O-impulse coming from the nand-gate 5, so that it will trip and return to its original position after a short characteristic time (of, e.g., several microseconds). In its stable condition, multivibrator 6 delivers an L-potential to an output lead 7 and delivers an O-potential to an output lead 8.

Lead 7 is connected to a control flip-flop 9 and to a monostable multivibrator 10. The control flip-flop 9 has two outputs 11 and 12 of different polarity, each being connected with an input of a nand-gate 14 and 13, respectively. An input of the nand-gate 14 is connected from the output of a quartz oscillator 15, which supplies impulses, denoted as computing pulses r, having a frequency of 100 kHz. Oscillator 15 also supplies its impulses to a frequency divider 16, which reduces the frequency at a ratio of 100 to 1, thereby delivering impulses m having a frequency of 1 kHz. These impulses m, called measuring impulses, are transmitted to an input of nand-gate 13. The output of nand-gate 13 is connected to a measuring counter 17, and the output of nand-gate 14 to a computing counter 18. Both counters 17 and 18 are constructed in a known manner as binary counters from a sequence of flip-flops connected in series. Counters 17 and 18 are connected to each other through a comparison circuit 19, which is constructed in a known manner per se from and-gates and or-gates so that when the two counters have the same reading, it will deliver an O-impulse z at its output 20 (which normally exists at L-potential). This impulse z is designated as a counting impulse.

Output 20 is connected with an input of a nand-gate 21, the output of which is connected via an inversion amplifier 22 with a monostable multivibrator 23, the output of which is normally at L-potential. Output 24 of multivibrator 23 is connected, on the one hand, with the computing counter 18 and, on the other hand, via an inversion amplifier 25 with an input of a nand-gate 26, the output of which is connected with a decade counter 27 of a known type. The output of decade counter 27 is connected to a digital indicator 28, which indicates numerically the position of decade counter 27 and is constructed in a known manner from digital-indicator lamps.

Another input of nand-gate 26 is connected with the output of a counter 29 (likewise constructed from binary counter flip-flops) designated as the limiting counter, and which has two inputs 30 and 31. The input 30 is connected with the output of nand-gate 14 and the input 31 is connected with the output (which normally exists at L-potential) of a monostable multivibrator 32 to which the decade counter 27 is also connected. The input of circuit 32 is connected from the output of nand-gate 33. An input of nand-gate 33 is connected, through a monostable circuit 34, from lead 8, and another input is connected from an input of nand-gate 35. An input of nand-gate 35 is connected with the output of a "first signal" flip-flop 36, which is so called because it trips only on receiving a first signal and remains in its new position until the end of the measurement. The output of the first signal flip-flop 36 is also connected to an input of nand-gate 14.

The output 12 of the control flip-flop 9 is connected to an input of a nand-gate 37, the output of which is connected with a monostable multivibrator 38. The output of circuit 38 is connected with the measuring counter 17. The output of the limiting counter 29 is connected via a lead 39 with an input of nand-gate 35, as well as via a monostable multivibrator 40 and an inversion amplifier 41 to an input of nand-gate 5. The monostable circuit 40 is adjustable by way of an adjusting means 40a, in such a way that the output impulse $d$ has a selectable duration, for purposes to be explained hereinafter.

Diodes 42 to 46 will only be conductive when a lead 47 receives an O-potential, which then serves for the zero setting of all counters of the 17, 18, 27, 29, and of the first signal flip-flop 36. The aforesaid lead 47 can receive the O-potential via a lead 48, which is connected to the output of a non-inverting amplifier 49. Lead 48 is also connected to an input of nand-gate 5 and also to an input of nand-gate 50.

The input of amplifier 49 is connected from the output of a "switch" flip-flop 51, which is used to switch the apparatus to "measure," "simulator operation" and "stop." An impulse generator 52 of variable frequency serves as a simulator; it can supply impulses having a repetition frequency of 50 to 500 impulses per minute, and its output is connected to an input of nand-gate 50. A measure push-button 53, which is connected to a negative supply terminal 55 via a resistor 54, makes it possible to transmit a negative potential of, e.g., −12 volt with respect to ground to the switch flip-flop 51 as well as to another flip-flop 57, in order to switch the instrument to measure. A simulator push-button 58 makes it possible to supply the flip-flops 51 and 57 with a negative potential in the same manner. The flip-flop 57 has two outputs 57b and 57a of opposite polarity, which are each respectively connected to one input of the nand-gates 3 and 50, so that one of these gates will be closed when the other is open. The push-buttons 53 and 58 are each also connected via a resistor 59 and 60, respectively, to a positive supply terminal 61.

An input of the switch flip-flop 51 is connected via a lead 62 from a signal-failure stop device 64 and from an automatic zero-setting device 63. The zero-setting device 63 has a monostable multivibrator 65 and two supply terminals 66 and 67. The signal-failure stop device 64 has a monostable multivibrator 66a, which is connected with the emitter (source) of a field effect transistor 67a, and similarly has two supply terminals 68 and 69. Terminal 68 is connected via the leads 70, 71, 72 and 48 and other circuit elements from the outputs of the amplifier 49 and the adjustable monostable switch 40. For the purpose of switching on the apparatus, the supply terminals 61 and 55, or 66 and 67, or 68 and 69, respectively are connected from a master switch (not shown) having a voltage supply source of, e.g., 24 volts, the center point of which is grounded. At the same time, all the other circuit elements which require a supply voltage (such as nand-gates, flip-flops, counters, etc.) are also connected with the supply source via leads which are not shown.

Further elements of the circuit, such as further resistors, rectifiers, and leads, as well as condensers, are evident from the drawing, and shall only be mentioned hereinafter if their function is not readily obvious to one skilled in the art.

FREQUENCY RECORDER OPERATION

In order to simplify comprehension of the mode of operation of the apparatus described, potentials O or L are inscribed on the drawing at some points of the circuit indicating the potential state at those points when the apparatus is in operating condition, i.e., after the closing of the above-mentioned master switch. However, where two potentials are separated by a comma, the first stands for the readiness state and the second for a subsequent state.

When this master switch is closed, the zero-setting device 63 feeds an L-impulse to lead 62 via monostable multivibrator 65 (the output of which is normally at O-potential), to adjust switching flip-flop 51 so that its output has an O-potential. The diodes 42 to 46 receive an O-potential via amplifier 49, lead 48, leads 72 and 73, lead 47, and leads 74 and 75, thus being activated into conduction. As a consequence of this monostable multivibrators 38 and 32 therefore produce zero-setting impulses for counters 17, or 27 and 29, respectively, while the monostable multivibrator 23 sets the counter 18 to zero via lead 76. Thus, when the apparatus is in readiness condition, all counters are automatically in the zero position, and, moreover, control flip-flop 9 and the first signal flip-flop 36 then also have the output potentials given in first position in the drawing.

When the measuring push-button 53 is activated, switch flip-flop 51 is enabled so that the potential of lead 48 changes from O to L. The output 57b of flip-flop 57 changes form O to L and the output 57a from L to O. The nand-gate 3 now becomes conductive for the first input impulse $e$ which has been transmitted by pickup 1 through the automatic gain control 2. The output impulse of nand-gate 3 travels through inversion amplifier 4 to nand-gate 5, which is now conductive for impulse. Leads 7 and 8 each receive an O- or L-impulse, through the monostable multivibrator. The O-impulse so switches the control flip-flop 9 so that output 11 changes from L to O, and output 12, from O to L. Simultaneously, the first signal flip-flop 36 is also switched via the monostable multivibrator 10, which serves as a delay so lead 77 changes from O to L. Line 77 subsequently remains on L-potential during the entire measurement.

Nand-gate 13 is now conductive for the 1 kHz. measuring impulses $m$, coming from the frequency divider 16, which impulses are summated in the measuring counter 17. The nand-gate 14 remains not conductive for the 100 kHz. calculating impulses 7, since the output 11 is at O. The measuring counter 17 summates until a second input impulse $e$ arrives. The second input impulse $e$ affects the control flip-flop 9 in the same manner as the first input impulse $e$, but the control flip-flop 9 now switches in such a way that the output 11 changes from O to L and output 12 from L to O. Gate 13 is therefore temporarily closed to the 1 kHz. measuring impulses $m$, whereas gate 14 is opened for the 100 kHz. computing impulses $r$, so that the computing counter 18 now summates these impulses. As soon as the computing counter 18 exhibits the same number of impulses as the measuring counter 17, the comparison circuit 19 releases a counting impulse $z$ at its output 20. Consequently, hand-gate 21 emits an impulse which, following inversion in the inversion amplifier 22, triggers the monostable multivibrator 23. The O-impulse emanating from the output of unit 23 on lead 24 resets the computing counter 18 back to zero and closes one input of gate 14, while, on the other hand, it is also transmitted, via inversion amplifier 25 and nand-gate 26 (whose other input is at L), as an O-impulse to the decade counter 27. This operation is repeated until the limiting counter 29, which has been permanently adjusted to the sum of 60,000 impulses, has received these 60,000 impulses from gate 14 through its input 30.

When this is the case, its output potential changes from L to O, so that gate 26 is closed and the decade counter 27 no longer receives the output impulses from comparison circuit 19. Furthermore, gate 14 is now closed through lead 39, so that no further computing impulses $r$ are transmitted to the computing counter 18 and to the limiting counter 29, which latter counter has accordingly limited the number of computing impulses used for the computation.

In briefly describing an example of the above computing operation, assuming that 0.8 second has elapsed between the first and the second input impulse $e$ (75 heart beats per minute), the measuring counter 17 will sum up or count 800 impulses during this time interval. Until the limiting counter 29 will count up the 60,000 impulses emitted from oscillator 15 via nand-gate 14, the computing counter 18 will reach the same reading as measuring counter 17, 60,000/800 or 75 times, at which time the comparison circuit 20 will have transmitted 75 counting impulses $z$ to decade counter 28 and the information "75," corresponding to the instantaneous heart frequency, can be readily read off from the digital indicator 28.

Since lead 39, an input of gate 35, is now likewise changed from L to O, the output of gate 35 is then changed from O to L after expiration of a delay interval introduced by condenser 35a. In addition, the monostable multivibrator 40 generates via inverter 41, an O-impulse $d$, whose duration is adjustable by means of the aforementioned adjusting means 40a. Gate 5 is closed during the duration of this impulse $d$ and the digital indication on counter 28 of the measured instantaneous value is retained. This delay by condenser 35a ensures the closure of gate 5 until impulse $d$ arrives at this gate 5 from the inversion amplifier 41, and takes over the closure. A new measurement can only be effected when impulse $d$ has passed. At all events, no measurement can be effected during the time interval between the second and third heart beat. When gate 5 is opened by the arrival of the third input impulse $e$ at its input, the operation that took place on the arrival of the first input impulse is repeated. Monostable multivibrator 34 serves to reset the measuring counter 17 to zero prior to commencement of the new instantaneous value measurement. Unit 34 reacts to the trailing edge of an L-impulse supplied by the monostable multivibrator 6, and provides delayed L-impulses to gates 33 and 37. The monostable multivibrator 38 is triggered by the output impulse of gate 37 and sets the measuring counter 17 to zero. This operation would have similarly taken place after the first input impulse, but it is then inconsequential, since the measuring counter 17 had at that time also been set to zero by the zero-setting device 63.

At the occurrence of the fourth input impulse, the monostable multivibrator 32 is triggered through gate 33 (which was still closed during the third impulse) to set the decade counter 27 and the limiting counter 29 to zero. This operation would have similarly taken place after the second input impulse, but then it is inconsequential, since counters 27 and 29 had anyway been set to zero by the zero-setting device 63.

If in the readiness position, the simulator button 58 is depressed, gate 3 is closed and gate 50 becomes conductive for the impulses emitted from simulator 52. As already mentioned, impulses of variable frequency can be generated with the simulator 58. This serves to adjust the measuring range of a recording apparatus 81, which can be connected with a digital-analog-converter 82 attached to the digital indicator 28. The recording apparatus 81 is represented in broken lines, since it does not form a part of the frequency-measuring apparatus.

The signal failure stop device 64 is provided in the event that the circuit should become defective or the input impulses fail. The device 64 contains a condenser 83, which on readiness of the apparatus changed to a negative potential with respect to ground via leads 72, 70 and later via the impulses arriving on lead 71. If inversion amplifier 41 no longer emits $d$-impulses, due to a defect or absence of incoming impulses, condenser 83 charges positively, e.g., after approximately 4 seconds, depending on the time constant of the RC-member 83, 84, 85, and in such a manner that the field effect transistor 67a activates the monostable multivibrator 66a whose output impulse, transmitted to line 62, returns the circuit back to the readiness position.

The digital indicator 28 will accordingly at any given time indicate the momentary frequency in impulses per minute corresponding to the interval between two successive heart beats, normally the momentary frequency between the first and second, the third and fourth heart beat, etc. In the event that the frequency is very high, it could happen that with the arrival of the third heart beat gate 5 has not yet been open, especially in those cases where the output impulse of the monostable multivibrator 40 might have been adjusted for a long duration of indication. The momentary frequency will then, for example, be measured between the first and second, the fourth and fifth, the eighth and ninth heart beat, etc. Of course, if desired, the apparatus may also be used with animals which can have a much higher cardiac frequency than man. Moreover, the apparatus can, as already mentioned, be used for the frequency measurement of impulses other than heart beat impulses, although in practice such other usage will be infrequent.

In order to terminate the measurement, a stop button 78 is activated, which is connected via a resistor 79 and a positive supply terminal 80, and via a line 81a and resistor 54 with the negative supply terminal 55. Through activation of stop button 78, the switch flip-flop 51 receives an impulse as a result of which its output changes to O, thereby closing gate 50 setting the circuit into the readiness position, exactly as when switching on the master switch (which additionally connects the supply terminal 80 with the voltage source). It is therefore impossible, for example, for a physician performing an operation to still receive an indication corresponding to the last measuring time interval in those instances where the patient's pulse beat has been discontinued for longer than approximately 4 seconds or in the event that the circuit has become defective.

It is further noted that commercially available integrated circuits (solid state circuits) can be used to construct the represented apparatus so that it can be made very compact despite its large number of circuit elements. The pick-up 1 is obviously interchangeable in order that it corresponds to the nature of the impulses to be picked up in a given case.

While we have particularly shown and described a preferred embodiment of the invention in the foregoing disclosure, it should be understood, of course, that numerous modifications or alterations may be made therein without departing from the spirit and the scope of the invention, it is desired, therefore, that only such limitations be placed on the invention as are imposed by the prior art and as set forth in the appended claims.

What is claimed is:

1. An apparatus for indicating momentary frequency values of an impulse series where input impulses are recorded by a pick-up attached to the input of the apparatus comprising:

amplifying means responsive to said recorded input impulses to provide impulses of substantially constant output level, logic means connected with said amplifying means for defining a measuring time interval corresponding to the interval between two consecutive input impulses, means for generating a first group of impulses of a precise known frequency and a second group of impulses of a much higher known frequency, measuring means for counting said first group of impulses during the recording of said measuring time interval, resettable computing means responsive to the termination of said measuring time interval for receiving and counting said second group of impulses, means connected with said computing means for receiving impulses fed thereto and for limiting the impulses counted thereby during said interval to a predetermined number, means connected to said measuring means and computing means for comparing the reading of the computing means to that of the measuring means and emitting a coincidence impulse for resetting said computing means upon reaching any multiple of the number counted by said measuring means, a decade counter responsive to such coincidence impulse, the position of which counter is indicated by a number indicator to correspond to the reciprocal value of the measuring time interval and thus to the momentary frequency value of this measuring time interval, whereupon after which computing process a similar cycle of events for measuring between two further impulses of the series is repeated.

2. Apparatus according to claim 1 characterized by the fact that the measuring frequency amounts of 1 kHz. and the limiting means limits the number of impulses transmitted to the computing means to 60 kHz. so that the number indicator indicates the momentary value of the frequency in impulses per minute.

3. Apparatus according to claim 1 characterized by the fact that said logic means includes:

first gate means by which the first group of impulses are transmitted to the measuring means, a second gate means by which the second group of impulses are transmitted to the computing means and to the limiting means, and a control flip-flop responsive to said two consecutive input impulses for opening the first gate means and closing the second gate means during said measuring time interval and which further closes said first gate means and opens said second gate means during the computing operation.

4. Apparatus according to claim 3 characterized by means for generating an impulse of variable adjustable duration for disabling said control flip-flop to provide a determinable period for display of an indication on said number indicator.

5. Apparatus according to claim 3 further characterized by the inclusion of a first signal flip-flop means having an output signal adapted to ensure closure of said second gate means at least until the occurrence of the first of said two consecutive input impulses.

6. Apparatus according to claim 3 characterized by the inclusion of an impulse generator of variable frequency serving as a simulator for providing impulses which can be transmitted to said control flip-flop in lieu of input impulses to adjust the recording area of a recording device which can be attached to a digital-analog transformer connected with the number indicator.

7. Apparatus according to claim 1 characterized by the inclusion of a zero-setting device for delivering a zero-setting impulse when the apparatus is switched on by means of which all the parts of the apparatus are brought to the ready position necessary at the commencement of a measuring operation.

8. Apparatus according to claim 7 characterized by the inclusion of a signal failure stop means for restoring the apparatus to the ready position when input signals lapse for a predetermined time as well as by the occurrence of a defect in the apparatus.

9. Apparatus according to claim 1 where said amplifying means includes a DC amplifier with negative feedback, discriminator means, having a threshold voltage, connected to the output of said amplifier and responsive to output voltages of said amplifier which exceed said threshold voltage, a raysistor comprising a photo-resistor and a light source, the photo-resistor being connected in the feedback loop form the output to the input of said amplifier and the light source connected between the discriminator output and the amplifier input, whereby with increasing positive deviation from said threshold voltage the light source becomes more activated thereby increasing the feedback of the amplifier.

References Cited

UNITED STATES PATENTS

| 2,324,077 | 7/1943 | Goodale et al. | 324—79 |
| 2,933,249 | 4/1960 | Scuitto | 235—152 |
| 3,281,723 | 10/1966 | Mercer | 328—173 X |
| 3,312,813 | 4/1967 | Vincent et al. | |

ALFRED E. SMITH, Primary Examiner

U.S. Cl. X.R.

324—68, 78; 330—29